United States Patent [19]

Poppel et al.

[11] Patent Number: 4,586,982
[45] Date of Patent: May 6, 1986

[54] PROCESS FOR THE DE-INKING OF PRINTED WASTE PAPER

[75] Inventors: Günter Poppel, Duren; Hasan Ulubay, Kreuzau, both of Fed. Rep. of Germany

[73] Assignee: Akzona Incorporated, Asheville, N.C.

[21] Appl. No.: 644,655

[22] Filed: Aug. 27, 1984

Related U.S. Application Data

[63] Continuation of Ser. No. 388,391, Jun. 14, 1982, abandoned.

[30] Foreign Application Priority Data

Jun. 12, 1981 [DE] Fed. Rep. of Germany ....... 3123353

[51] Int. Cl.$^4$ .............................. D21C 5/02
[52] U.S. Cl. ........................... 162/5; 162/6; 162/8
[58] Field of Search .................... 162/5, 6, 8

[56] References Cited

U.S. PATENT DOCUMENTS 2,112,562 3/1938 Fisher ........................... 162/5
4,013,505 3/1977 Balcar et al. ................. 162/5
4,360,439 11/1982 Calmanti et al. .............. 162/5

FOREIGN PATENT DOCUMENTS 0013758 12/1979 European Pat. Off. .
0067333 12/1982 European Pat. Off. ............ 162/5
0396071 3/1922 Fed. Rep. of Germany .
0415062 7/1924 Fed. Rep. of Germany .
1922038 11/1970 Fed. Rep. of Germany .
2903150 8/1980 Fed. Rep. of Germany .
46-30962 9/1971 Japan ............................ 162/5

Primary Examiner—S. Leon Bashore
Assistant Examiner—K. M. Hastings
Attorney, Agent, or Firm—Parkhurst & Oliff

[57] ABSTRACT

There is disclosed an improvement to the process for the de-inking of printed waste paper which comprises (1) treating the waste paper in a pulper at an alkaline pH with alkali silicate, an oxidatively active bleaching agent, one or more acid components selected from the group consisting of fatty acids and resinic acids containing more than 10 carbon atoms, and mixtures thereof, and a dispersing agent, and (2) separating the detached printing ink particles from the fiber suspension by either flotation, washing, or a combination thereof. The improvement comprises employing the acid and the dispersing agent in the form of an oil-in-water emulsion.

20 Claims, No Drawings

PROCESS FOR THE DE-INKING OF PRINTED WASTE PAPER

This is a continuation of application Ser. No. 388,391 filed June 14, 1982 now abandoned.

BACKGROUND OF THE INVENTION

This invention relates to a process for the de-inking of printed waste paper. In particular, this invention relates to such a process in which waste paper is treated in a pulper at alkaline pH values, with alkali silicate, oxidatively active bleaching agents, fatty acids and/or resinic acids containing more than 10 carbon atoms, and dispersing agents. Such a process also includes the separation of the detached printing ink particles from the fibrous material suspension through flotation and/or washing.

For purposes of the present invention, the term "de-inking" means the removal of printed inks from waste paper fiber suspensions. In the de-inking process cleaned fibers are reused for the manufacture of various qualities of paper, such as printing stock, sanitary papers, writing papers, and the like. It is important that in the course of the de-inking process, the printed waste papers are pulped with an addition of chemicals causing the printing inks to become detached from the fibers. The detached printing inks are subsequently removed from the fibrous suspension through flotation, washing, or a combination of such processes. In both the flotation as well as the washing processes, the waste paper typically is pulped in an alkaline environment with the addition of soda lye, alkali silicate, and hydrogen peroxide, as well as a collector, surfactant, and a sequestering agent. Then, in the flotation cells, the fibrous material is cleaned by floating out the printing inks, or by use of a filter, the fibrous material is washed to remove the printing inks. The fibrous material which is recovered may then be utilized in the production of paper.

The addition of alkali to the waste paper results in a swelling of the cellulose fibers and removes the hydrogen bridge bond, making possible easy decomposition of the waste paper. The alkali also functions to saponify fatty acids, if such materials have been used as collectors. The soaps cause a reduction in surface tension or interfacial tension, and detach the printing inks. In part, the soaps precipitate with the agents which cause the hardening of the water, in the form of insoluble calcium soaps, and attach to the printing inks, making them hydrophobic.

In order to improve the detaching of the printing inks and the dispersion, use typically is also made of non-ionic surfactants such as fatty alcohol polyglycolethers, or alkylphenol polyglycol-ethers, which also aid in the development of foam in the flotation cells.

Hydrogen peroxide is the oxidatively active bleaching agent generally used to prevent yellowing of the fibers which may result from the use of the alkali. Other chemicals, such as sodium silicate and sequestering agents, stabilize the bleaching liquor. Thus, the sequestering agents prevent rapid decomposition of the hydrogen peroxide by heavy metal ions, such as copper, iron, manganese, or the like.

In German Pat. No. 2,903,150, there is listed the following combination of chemicals, based upon the weight of the waste paper:

2-5% by weight of alkali silicate (sodium silicate)
0.5-3% by weight of hydrogen peroxide (100%)
0.5-2% by weight of sodium hydroxide (100%)
0.3-2% by weight of fatty acids, or salts
0.02-0.5% by weight of non-ionic dispersing agent If sequestering agents are used, they may be added in a quantity of up to 0.4%, by weight, as in the form of commercially available material which has a 40% concentration. The stock density in the pulper is from 4 to 7%, by weight, and the temperature is 20° to 50° C. Depending upon the intended use of the paper to be reprocessed, different qualities of waste paper are used, such as newspaper, magazines, NCR papers, labels, and the like. In the event of a later use in sanitary papers, one uses newspapers with a low ash content, whereas for later use in printing papers, one uses a waste paper mixture of newspapers and magazines at a ratio of 1:1. Frequently, the difficulty in removing the printing inks from the waste paper depends upon the printing method and the printing ink composition.

In general, the degree of whiteness of a waste paper mixture consisting of the printless margin of newspapers and magazines in a ratio of 1:1 is 61 to 63%. When 1:1 mixtures of printed newspapers and magazines are de-inked, one generally gets a degree of whiteness of 58 to 60%, when fatty acids are used. In such an instance, the fatty acids are added in the liquid state, immediately before the waste paper is ground up. Unless the fatty acids are already liquid at room temperature, the solid fatty acids require the use of a melting device. Under the mild reaction conditions in the pulper, the fatty acids saponify very slowly, causing coarse flocculation. The calcium soap formed on the surface of the flocks impedes further saponification of the enclosed fatty acids and prevents them from becoming active. The unsaponified fatty acid becomes attached to the fibers and, by making them hydrophobic, results in higher fiber losses during flotation.

An object of the present invention is to improve the known de-inking processes to overcome the aforementioned disadvantages.

SUMMARY OF THE INVENTION

The foregoing objects are achieved by the present invention which provides an improvement to the process for the de-inking of printed waste paper which comprises (1) treating the waste paper in a pulper at an alkaline pH with alkali silicate, an oxidatively active bleaching agent, one or more acid components selected from the group consisting of fatty acids and resinic acids containing more than 10 carbon atoms, and mixtures thereof, and a dispersing agent, and (2) separating the detached printing ink particles from the fiber suspension by either flotation, washing, or a combination thereof. The improvement comprises employing the acid and the dispersing agent in the form of an oil-in-water emulsion.

The present invention also provides a process for the de-inking of printed waste paper, comprising treating the waste paper in a pulper with, based on the total weight of the waste paper, (1) from about 1 to about 5% of alkali silicate, (2) from about 0.5 to about 2% of sodium hydroxide and/or sodium carbonate, (3) from about 0.5 to about 3% of an oxidatively active bleaching agent, and (4) from about 0.2 to about 1.5% of one or more acid components selected from the group consisting of fatty acids and resinic acids, containing more than 10 carbon atoms, and mixtures thereof, in the form of an oil-in-water emulsion, said emulsion containing from about 1 to about 35% of a non-ionic and/or an anionic dispersing agent, based upon the total weight of acid, and separating the detached printing ink particles from the filter suspension by either flotation, washing, or a combination thereof.

DETAILED DESCRIPTION OF THE PREFERRED EMBODIMENTS

As stated, the present invention provides an improved process for the de-inking of printed waste paper which utilizes the fatty acids and/or resinic acids, and dispersing agents, in the form of an oil-in-water emulsion. When the emulsion is added to the alkaline liquor, there occurs a spontaneous saponification of the fatty acids and/or resinic acids. Depending upon the emulsifier concentration and the degree of hardness of the water, the alkali soap, together with the hardness-causing substances in the water, will then result in a more or less strong precipitation of calcium soaps, in very fine flocks. These fine flocks act as selective collectors for the printing inks and prevent their redepositing on the paper fibers.

Pre-emulsified fatty acids and/or resinic acids can be used before or during repulping of the waste paper, even if the stock density is high. This already takes into consideration developments aimed at repulping the waste paper at a high stock density (15 to 20%) (e.g. waste paper repulping drums or a helico pulper).

Another advantage of the present process resides in the fact that it is also possible to use fatty acids with a high melting point, or paraffins in dispersed form, as de-inking auxiliaries, without encountering problems in application technology.

Even without an addition of non-ionic dispersing agents, fatty acids and/or resinic acids in dispersed form result in excellent detaching of the printing ink and selective discharge of the printing inks in the flotation cells. As a consequence, one obtains higher degrees of whiteness, lower fiber losses, and higher ash reduction.

Preferably, the concentration of the fatty acids and/or resinic acids in the oil-in-water emulsion is about 20 to about 50%, by weight, based on the total weight of the emulsion. For the preparation of the emulsion, use is preferably made of non-ionic and/or anionic dispersing agents. Referred to the fatty acids and/or resinic acids, one typically uses about 1 to about 35% by weight of non-ionic and/or anionic dispersing agent. If anionic dispersing agents are used, they preferably amount to about 1 to about 10% by weight, based on the total weight of fatty acid and/or resinic acid in the emulsion. In particular, alkali and/or amine salts of fatty acids and/or resinic acids and/or olefin sulfonates and/or fatty alcohol sulfates and/or fatty alcohol polyglycolether sulfates have been found to be good anionic dispersing agents. Suitable non-ionic dispersing agents were found to include fatty acid polyglycolesters, fatty alcohol polyglycolethers, resinic acid polyglycolesters, alkylphenol polyglycolethers, and ethoxylated fatty acid mono- and/or diglycerides. Fatty acid polyglycolesters and/or resinic acid polyglycolesters are preferably used with an ethylene oxide constituent of 3 to 10 moles. Preferably, the proportion of non-ionic dispersing agent is about 5 to about 25% by weight, based on the total weight of fatty acid and/or resinic acid.

The present invention is explained in further detail by the following nonlimiting examples.

COMPARATIVE EXAMPLE 1

120 g of a waste paper mixture consisting of: 60 g newspapers and 60 g magazines are impregnated for 5 minutes at a stock density of 12% and a temperature of 20° to 50° C. with the addition of the chemicals listed below (which are based on the bone dry weight of the waste paper) and then desintegrated for 5 minutes at a stock density of 4%. The hardness of the water was 12° dh.

1.2% of 100% soda lye
4.0% of sodium silicate, 36°-40° Bé
0.2% of Dissolvine D 40 ($Na_5$-DTPA)
0.8% of oleic acid The swelling time was 2 hours.

After a 2 minute deflaking in an Ultra-Turrax ®, the stock suspension was diluted with water of about 12° dh to a stock density of 0.8% and floated for 12 minutes in a Voith laboratory flotation cell.

The quantity, dry substance content, and ash content of the collected foam were determined. The clean stock suspension was then acidified to a pH of 5 with sulfuric acid. The degree of whiteness of the test sheets made on a "Rapid-Koethen" sheet former was determined with an Elrepho ® testing unit.

| Process temperature | Degree of whiteness |
|---|---|
| 20° C. | 58.5% |
| 50° C. | 62.3% |

COMPARATIVE EXAMPLE 2

The procedure followed was the same as in Example 1, except that instead of the oleic acid, use was made of 0.8% by weight of a commercially available de-inking soap.

| Product used | Process temperature | Degree of whiteness |
|---|---|---|
| soap | 20° C. | 57.5% |
| soap | 50° C. | 61.9% |

EXAMPLE 3

The procedure followed was the same as in Example 1, except that instead of the oleic acid, use was made of 0.8% (based on the dry weight)—referred to the waste paper—of an oleic acid emulsion.

The oleic acid emulsion was composed of the following substances:
300 parts water
100 parts oleic acid
20 parts oleic acid polyglycolester.3 ethylene oxide
5 parts fatty alcohol polyglycolether.8 ethylene oxide
5 parts fatty alcohol polyglycolether sulfate
2 parts triethanolamine

| Quantity used | Process temperature | Degree of whiteness |
|---|---|---|
| 0.8% | 20° C. | 61.7% |
| 0.8% | 50° C. | 64.7% |

EXAMPLE 4

The procedure was the same as in Example 1, except that instead of the oleic acid, use was made of 0.8%

(based on the dry weight) of a fatty acid/resinic acid emulsion.

The emulsion was composed as follows:
300 parts water
100 parts tall oil distillate with 20 to 25% resinic acid
20 parts oleic acid polyglycolester.3 ethylene oxide
5 parts fatty alcohol polyglycolether.8 ethylene oxide
5 parts fatty alcohol polyglycolether sulfate
2 parts triethanolamine

| Quantity used | Process temperature | Degree of whiteness |
| --- | --- | --- |
| 0.8% | 20° C. | 61.5% |
| 0.8% | 50° C. | 64.8% |

EXAMPLE 5

The procedure followed was the same as in Example 4, but the emulsion contained a tall oil distillate with 25 to 30% resinic acid. The other additions to the emulsion were the same as in Example 4.

| Process temperature | Degree of Whiteness |
| --- | --- |
| 20° C. | 61.5% |
| 50° C. | 64.1% |

EXAMPLE 6

The procedure was carried out as in Example 3, except that the oleic acid emulsion was composed of the following substances:
250 parts water
100 parts oleic acid
5 parts fatty alcohol polyglycolether sulfate
2 parts triethanolamine

| Quantity used | Process temperature | Degree of whiteness |
| --- | --- | --- |
| 0.5% | 50° C. | 61.2% |
| 1.0% | 50° C. | 64.6% |

EXAMPLE 7

The procedure followed was the same as in Example 4, but the fatty acid/resinic acid emulsion had the following composition:
250 parts water
100 parts tall oil distillate with 20 to 25% resinic acid
5 parts fatty alcohol polyglycolether sulfate
2 parts triethanolamine

| Quantity used | Process temperature | Degree of whiteness |
| --- | --- | --- |
| 0.8% | 20° C. | 61.1% |
| 0.8% | 50° C. | 64.3% |

EXAMPLE 8

The procedure was the same as in Example 5, but the fatty acid/resinic acid emulsion had the following composition:
250 parts water
100 parts tall oil distillate with 25 to 30% resinic acid
5 parts fatty alcoholpolyglycolether sulfate
2 parts triethanolamine

| Quantity used | Process temperature | Degree of whiteness |
| --- | --- | --- |
| 0.8% | 20° C. | 60.7% |
| 0.8% | 50° C. | 64.2% |

EXAMPLE 9

The following emulsion composition was used in the procedure of Example 3:
300 parts water
100 parts mixed fatty acid
20 parts fatty acid polyglycolester.3 ethylene oxide
5 parts fatty alcohol polyglycolether.8 ethylene oxide
5 parts fatty alcohol polyglycolether sulfate
2 parts triethanolamine

| Quantity used | Process temperature | Degree of whiteness |
| --- | --- | --- |
| 0.8% | 20° C. | 61.2% |
| 0.8% | 50° C. | 64.7% |

EXAMPLE 10

The following emulsion composition was used in the procedure of Example 3:
280 parts water
100 parts oleic acid
10 parts fatty acid polyglycolester.3 ethylene oxide
2.5 parts fatty acid polyglycolester.8 ethylene oxide
5 parts fatty alcohol polyglycolether sulfate
2 parts triethanolamine

| Quantity used | Process temperature | Degree of whiteness |
| --- | --- | --- |
| 0.8% | 20° C. | 61.6% |
| 0.8% | 50° C. | 64.4% |

EXAMPLE 11

The following emulsion was used in the procedure of Example 3:
280 parts water
100 parts tall oil distillate with 20 to 25% resinic acid
10 parts fatty acid polyglycolester.3 ethylene oxide
2.5 parts fatty acid polyglycolester.7 ethylene oxide
5 parts fatty alcoholpolyglycolether sulfate
2 parts triethanolamine

| Quantity used | Process temperature | Degree of whiteness |
| --- | --- | --- |
| 0.8% | 20° C. | 61.5% |
| 0.8% | 50° C. | 63.5% |

EXAMPLE 12

The following emulsion composition was used in the procedure of Example 3:
280 parts water
100 parts tall oil distillate with 25 to 30% resinic acid
10 parts fatty acid polyglycolester.3 ethylene oxide
2.5 parts fatty acid polyglycolester.7 ethylene oxide
5 parts fatty alcohol polyglycolether sulfate
2 parts triethanolamine

| Quantity Used | Process temperature | Degree of whiteness |
| --- | --- | --- |
| 0.8% | 20° C. | 61.3% |

-continued

| Quantity Used | Process temperature | Degree of whiteness |
|---|---|---|
| 0.8% | 50° C. | 63.7% |

EXAMPLE 13

The following emulsion composition was used in the procedure of Example 3:
280 parts water
100 parts mixed fatty acid
10 parts fatty acid polyglycolester.3 ethylene oxide
2.5 parts fatty acid polyglycolester.7 ethylene oxide
5 parts fatty alcohol polyglycolether sulfate
2 parts triethanolamine

| Quantity used | Process temperature | Degree of whiteness |
|---|---|---|
| 0.8% | 20° C. | 61.6% |
| 0.8% | 50° C. | 64.0% |

A comparison of the tested formulations as set forth in the Table shows the distinct advantages of the emulsion as regards degree of whiteness, ash reduction and fiber losses.

TABLE

| Product | quantity used % | Temp. °C. | total losses % | ash constituent of total loss % | degree of whiteness % |
|---|---|---|---|---|---|
| oleic acid | 0.8 | 50 | 20.3 | 28.3 | 62.3 |
| soap emulsions | 0.8 | 50 | 18.5 | 26.2 | 61.9 |
| example 3 | 0.8 | 50 | 16.2 | 28.5 | 64.7 |
| example 4 | 0.8 | 50 | 16.4 | 30.7 | 64.8 |
| example 5 | 0.8 | 50 | 14.4 | 31.9 | 64.1 |
| example 7 | 0.8 | 50 | 17.1 | 30.9 | 64.2 |
| example 8 | 0.8 | 50 | 17.8 | 30.9 | 64.2 |
| example 9 | 0.8 | 50 | 17.9 | 28.9 | 64.7 |
| example 10 | 0.8 | 50 | 14.0 | 32.7 | 64.4 |
| example 11 | 0.8 | 50 | 13.0 | 34.7 | 63.5 |
| example 12 | 0.8 | 50 | 13.4 | 33.7 | 63.7 |
| example 13 | 0.8 | 50 | 14.5 | 31.7 | 64.0 |

What is claimed is:

1. In an improved process for the de-inking of printed waste paper which comprises (1) treating the waste paper in a pulper at an alkaline pH with alkali silicate, an oxidatively active bleaching agent, an acid selected from the group consisting of fatty acids and resinic acids containing more than 10 carbon atoms, and mixtures thereof, and a dispersing agent, and (2) separating the detached printing ink particles from the fiber suspension by either flotation, washing, or a combination thereof, the improvement comprising employing the acid and the dispersing agent together in the form of an oil-in-water emulsion.

2. The process of claim 1 wherein the concentration of acid in the emulsion is from about 20 to about 50 percent, by weight, based on the total weight of the emulsion.

3. The process of claim 1 wherein the oil-in-water emulsion contains a non-ionic dispersing agent, an anionic dispersing agent, or a combination thereof.

4. The process of claim 3 wherein the amount of dispersing agent is from about 1 to about 35 percent, by weight, based on the total weight of acid.

5. The process of claim 4 wherein the dispersing agent is an anionic dispersing agent, is present in an amount from about 1 to about 10 percent, based on the total weight of acid, and is selected from the group consisting of alkali and amine salts of fatty acids, alkali and amine salts, olefin sulfonates, fatty alcohol sulfates, fatty alcohol polyglycolether sulfates, and combinations thereof.

6. The process of claim 4 wherein the dispersing agent is non-ionic and is selected from the group consisting of fatty acid polyglycolesters, fatty alcohol polyglycolethers, resinic acid polyglycolesters, alkyl phenol polyglycolethers, ethoxylated fatty acid monoglycerides, ethoxylated fatty acid diglycerides, and combinations thereof.

7. The process of claim 4 wherein the dispersing agent is non-ionic, is present in an amount from about 5 to about 25 percent, by weight, based on the total weight of acid, and is selected from the group consisting of fatty acid polyglycolesters and resinic acid polyglycolesters containing from 3 to 10 moles of ethylene oxide, and combinations thereof.

8. A process for the de-inking of printed waste paper, comprising treating the waste paper in a pulp digestor with, based on the total weight of the waste paper, (1) from about 1 to about 5% of alkali silicate, (2) from about 0.5 to about 2% of sodium hydroxide and/or sodium carbonate, (3) from about 0.5 to about 3% of an oxidatively active bleaching agent, and (4) from about 0.2 to about 1.5% of an acid selected from the group consisting of fatty acids and resinic acids, containing more than 10 carbon atoms, and mixtures thereof, in the form of an oil-in-water emulsion, said emulsion containing from about 1 to about 35% of a non-ionic and/or an anionic dispersing agent, based upon the total weight of acid, and separating the detached printing ink particles from the resulting fiber suspension by either flotation, washing, or a combination thereof.

9. The process of claim 8 wherein the concentration of acid in the emulsion is from about 20 to about 50 percent, by weight, based on the total weight of the emulsion.

10. The process of claim 8 wherein the dispersing agent is an anionic dispersing agent, is present in an amount from about 1 to about 10 percent, based on the total weight of acid, and is selected from the group consisting of alkali and amine salts of fatty acids, alkali and amine salts, olefin sulfonates, fatty alcohol sulfates, fatty alcohol polyglycolether sulfates, and combinations thereof.

11. The process of claim 8 wherein the dispersing agent is non-ionic and is selected from the group consisting of fatty acid polyglycolesters, fatty alcohol polyglycolethers, resinic acid polyglycolesters, alkyl phenol polyglycolethers, ethoxylated fatty acid monoglycerides, ethoxylated fatty acid diglycerides, and combinations thereof.

12. The process of claim 8 wherein the dispersing agent is non-ionic, is present in an amount from about 5 to about 25 percent, by weight, based on the total weight of acid, and is selected from the group consisting of fatty acid polyglycolesters and resinic acid polyglycolesters containing from 3 to 10 moles of ethylene oxide, and combinations thereof.

13. The process of claim 2 wherein the oil-in-water emulsion contains a non-ionic dispersing agent, an anionic dispersing agent, or a combination thereof.

14. The process of claim 13 wherein the amount of dispersing agent is from about 1 to about 35 percent, by weight, based on the total weight of acid.

15. The process of claim 14 wherein the dispersing agent is an anionic dispersing agent, is present in an amount from about 1 to 10 percent, based on the total weight of acid, and is selected from the group consisting of alkali and amine salts of fatty acids, alkali and amine salts, olefin sulfonates, fatty alcohol sulfates, fatty alcohol polyglycolether sulfates, and combinations thereof.

16. The process of claim 14 wherein the dispersing agent is non-ionic and is selected from the group consisting of fatty acid polyglycolesters, fatty alcohol polyglycolethers, resinic acid ployglycolesters, alkyl phenol polyglycolethers, ethoxylated fatty acid monoglycerides, ethoxylated fatty acid diglycerides, and combinations thereof.

17. The process of claim 14 wherein the dispersing agent is non-ionic, is present in an amount from about 5 to about 25 percent, by weight, based on the total weight of acid, and is selected from the group consisting of fatty acid polyglycolesters and resinic acid polyglycolesters containing from 3 to 10 moles of ethylene oxide, and combinations thereof.

18. The process of claim 9 wherein the dispersing agent is an anionic dispersing agent, is present in an amount from about 1 to about 10 percent, based on the total weight of acid, and is selected from the group consisting of alkali and amine salts of fatty acids, alkali and amine salts, olefin sulfonates, fatty alcohol sulfates, fatty alcohol polyglycolether sulfates, and combinations thereof.

19. The process of claim 9 wherein the dispersing agent is non-ionic and is selected from the group consisting of fatty acid polyglycolesters, fatty alcohol polyglycolethers, resinic acid polyglycolesters, alkyl phenol polyglycolethers, ethoxylated fatty acid monoglycerides, ethoxylated fatty acid diglycerides, and combinations thereof.

20. The process of claim 9 wherein the dispersing agent is non-ionic, is present in an amount from about 5 to about 25 percent, by weight, based on the total weight of acid, and is selected from the group consisting of fatty acid polyglycolesters and resinic acid polyglycolesters containing from 3 to 10 moles of ethylene oxide, and combinations thereof.

* * * * *

UNITED STATES PATENT AND TRADEMARK OFFICE
CERTIFICATE OF CORRECTION

PATENT NO. : 4,586,982

DATED : May 6, 1986

INVENTOR(S) : Gunter POPPEL et al

It is certified that error appears in the above-identified patent and that said Letters Patent is hereby corrected as shown below:

Column 9, line 12, change "ployglycolesters," to --polyglycolesters,--.

Signed and Sealed this
Fourteenth Day of October, 1986

[SEAL]

*Attest:*

DONALD J. QUIGG

*Attesting Officer*    *Commissioner of Patents and Trademarks*